United States Patent
Hammerl

(10) Patent No.: US 9,658,099 B2
(45) Date of Patent: May 23, 2017

(54) VEHICLE WHEEL SPEED-BASED DETERMINATION OR ESTIMATION OF A LOAD WEIGHT OF A LOAD CARRIED BY A COMMERCIAL VEHICLE

(71) Applicant: JUNGHEINRICH AKTIENGESELLSCHAFT, Hamburg (DE)

(72) Inventor: Robert Hammerl, Hohenthann (DE)

(73) Assignee: JUNGHEINRICH AKTIENGESELLSCHAFT, Hamburg (DE)

(*) Notice: Subject to any disclaimer, the term of this patent is extended or adjusted under 35 U.S.C. 154(b) by 0 days.

(21) Appl. No.: 14/818,856

(22) Filed: Aug. 5, 2015

(65) Prior Publication Data
US 2016/0041028 A1    Feb. 11, 2016

(30) Foreign Application Priority Data

Aug. 6, 2014    (DE) .................. 10 2014 215 509

(51) Int. Cl.
| | |
|---|---|
| G01G 19/08 | (2006.01) |
| B66F 9/06 | (2006.01) |
| G01G 9/00 | (2006.01) |

(52) U.S. Cl.
CPC .............. *G01G 19/08* (2013.01); *B66F 9/06* (2013.01); *G01G 9/00* (2013.01); *G01G 19/083* (2013.01); *G01G 19/086* (2013.01)

(58) Field of Classification Search
CPC ........ G01G 19/08; G01G 9/00; G01G 19/083; G01G 19/086; B66F 9/06

(Continued)

(56) References Cited

U.S. PATENT DOCUMENTS

| | | | |
|---|---|---|---|
| 2006/0064238 A1* | 3/2006 | Kitano ................. | B60C 23/061 701/124 |
| 2010/0174437 A1* | 7/2010 | Benedict .............. | B60T 8/1725 701/31.4 |
| 2014/0008132 A1 | 1/2014 | Kamamann et al. | |

FOREIGN PATENT DOCUMENTS

| | | |
|---|---|---|
| DE | 10 2007 047 399 A | 4/2008 |
| DE | 10 2007 047 399 A1 | 4/2008 |

(Continued)

OTHER PUBLICATIONS

Germany Search Report dated Jul. 16, 2015, issued in counterpart Application No. 10 2014 215 509.6 (10 pages)(see category relevances at p. 2).

(Continued)

*Primary Examiner* — Anne M Antonucci
(74) *Attorney, Agent, or Firm* — Westerman, Hattori, Daniels & Adrian, LLP

(57) ABSTRACT

A method for determining or estimating a load weight of a load (28) carried by a commercial vehicle, in particular by an industrial truck such as a forklift truck (10), comprises:
  a) determining a speed ratio between a first speed of at least one first wheel (12) loaded by a load carried in a load carrier (18) of the vehicle and a second speed of at least one second wheel (14) of the operating vehicle (10) which has received the load in the load carrier, which second wheel is less heavily loaded or not loaded by a load carried in the load carrier or is relieved by a load carried in the load carrier;
  b) determining or estimating the load weight of the carried load (28) on the basis of the determined speed ratio and predetermined reference data.

Figure 1:
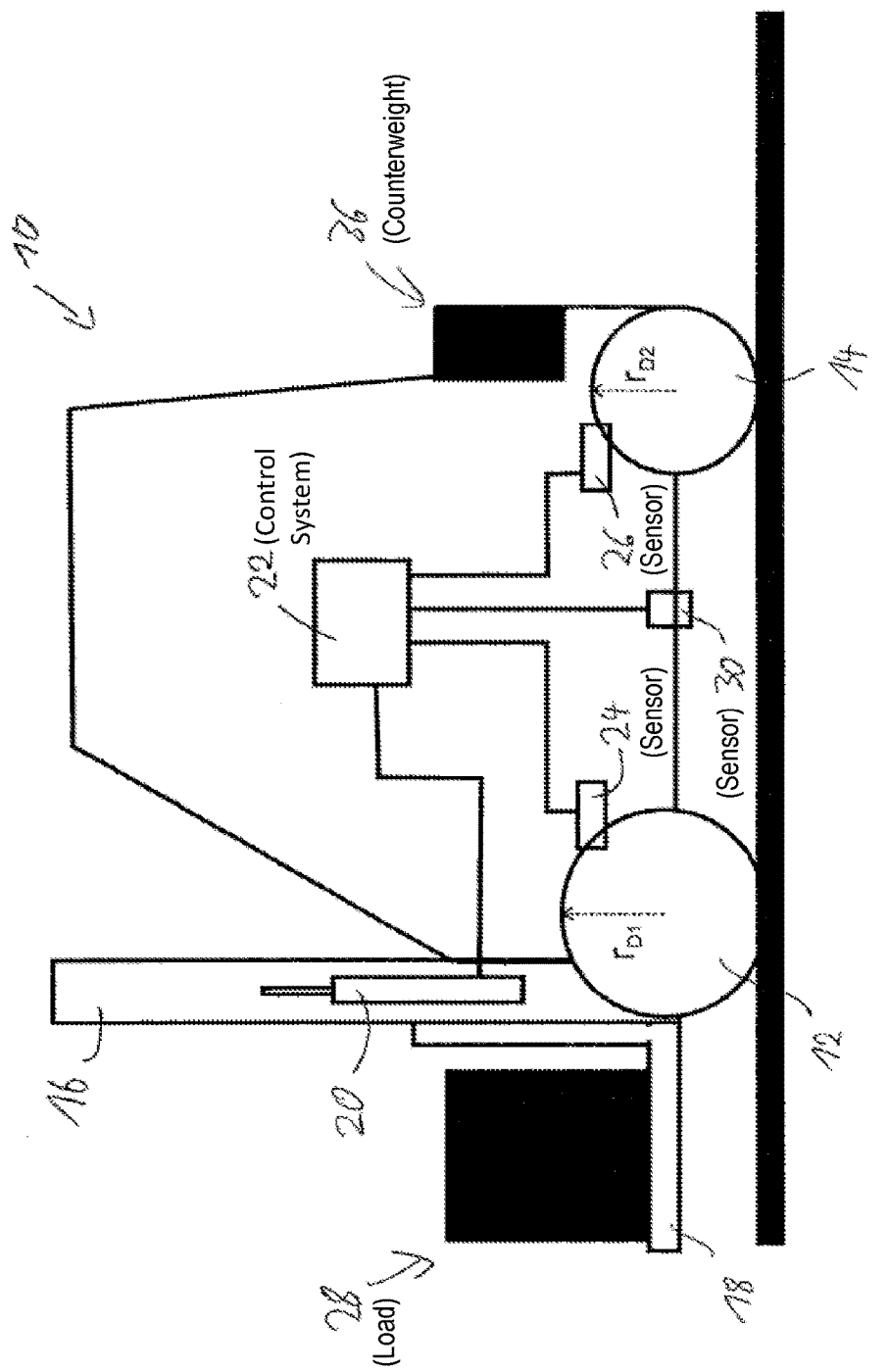

A commercial vehicle (10) comprising a control system (22) carrying out a method of this kind is also provided.

19 Claims, 3 Drawing Sheets

(58) Field of Classification Search
USPC .......................................................... 701/50
See application file for complete search history.

(56) References Cited

FOREIGN PATENT DOCUMENTS

| | | |
|---|---|---|
| DE | 10 2010 031 464 A1 | 1/2012 |
| DE | 10 2011 004 028 A1 | 8/2012 |
| DE | 10 2011 076 815 A1 | 12/2012 |
| DE | 10 2011 076 816 A1 | 12/2012 |
| DE | 10 2011 053 961 A1 | 3/2013 |
| DE | 10 2011 053 963 A1 | 3/2013 |
| EP | 2 502 759 A1 | 9/2012 |

OTHER PUBLICATIONS

Search Report dated Nov. 12, 2015, issued in counterpart EuropeanPatent Application No. 15179781.8 (7 pages).

* cited by examiner

VEHICLE WHEEL SPEED-BASED DETERMINATION OR ESTIMATION OF A LOAD WEIGHT OF A LOAD CARRIED BY A COMMERCIAL VEHICLE

The invention relates to a method for determining or estimating a load weight of a load carried by a commercial vehicle, in particular by an industrial truck such as a forklift truck, and to a corresponding commercial vehicle, in particular an industrial truck such as a forklift truck, which is equipped with means for determining or estimating the load weight of a carried load on the basis of said method.

Conventional industrial trucks usually do not comprise any technical means for carrying out a weight measurement in respect of the carried load. In the meantime, technical means for such weight measurement have been introduced in industrial trucks, but said means all require special sensor elements. It is thus known to carry out the weight measurement by measuring the hydraulic pressure, in particular the hydraulic pressure prevailing in the lifting cylinder of the mast. A weight measurement can conventionally also be performed by means of scales in the attachment or by means of pressure load cells in the chain grapple. Additional sensor elements are required in all of these conventional solutions for measuring the weight of the load, which elements relate only to said weight measurement.

Measurement of the load weight of the carried load is generally very useful in the case of an industrial truck. The vehicle dynamics can thus be configured in a load-dependent manner on the basis of a weight measurement. A problem with the conventional solutions, in particular carrying out weight measurement by measuring the hydraulic pressure using a weight sensor, is that such measurement can only be checked for correct functioning with difficulty. Therefore, the mechanical ratios in the mast may change and the hydraulic ratios in the hydraulic system may change, both of which can distort the result of the weight measurement. Since operational safety is of high importance, such weight measurements can hardly be used for selecting load-dependent vehicle profiles, for example, as long as no further, independent measurement system is present which permits a plausibility check for the performed weight measurement.

A method for calculating wear of a wheel from an increase in the rotational speed as a measure for the reduction of the wheel diameter is known from DE 10 2011 053 963 A1.

DE 10 2011 076 815 A1 and DE 10 2011 076 816 A1 each provide a method for controlling at least one electric drive unit of an industrial truck, which prevents the occurrence of slip at the drive wheels as a result of the generated torque for accelerating or slowing the industrial truck. According to both disclosures, the live load is identified in that the hydraulic pressure produced by the live load in a lifting cylinder of a mast of the respective forklift truck is detected.

According to DE 10 2011 076 816 A1, in conjunction with the slip prevention, a change in the speed ratios between the vehicle wheels is taken into account as a function of the live load in order to be able to set a low tolerance threshold for the slip identification. The effective radii on the vehicle wheels are calculated, at least approximately, from the measured hydraulic pressure in order to take said radii into account when calculating the vehicle speed or when calculating the speed for the purpose of slip identification.

In this context, an object of the invention is that of providing a method for determining or estimating the load weight, which does not require any dedicated sensors specific to weight measurement.

According to one aspect, in particular a method for determining or estimating the load weight should be provided, in which the determination or estimation of the load weight serves as a plausibility check for the weight measurement carried out by at least one dedicated sensor element.

According to a further aspect, a method for determining or estimating the load weight should be provided, which can be implemented without performing a weight measurement by means of dedicated sensor elements, and can thus replace a conventional weight measurement by means of at least one dedicated sensor element, thereby saving the technical outlay for a conventional weight measurement.

In order to achieve these objects, the invention provides a method for determining or estimating a load weight of a load carried by a commercial vehicle, in particular by an industrial truck such as a forklift truck, comprising:
a) determining a speed ratio between a first speed of at least one first wheel loaded by a load carried in a load carrier of the vehicle and a second speed of at least one second wheel of the operating vehicle which has received the load in the load carrier, which second wheel is less heavily loaded or not loaded by a load carried in the load carrier or is relieved by a load carried in the load carrier;
b) determining or estimating the load weight of the carried load on the basis of the determined speed ratio and predetermined reference data.

The proposal of the invention permits the load weight to be determined or estimated from the change in the wheel compression on the vehicle axle close to the load and that further from the load. The load wheels and the wheel or wheels further from the load (typically the drive wheel or wheels) are compressed in a specific ratio by the unladen weight of the vehicle, which causes the circumference of all wheels to deviate from an ideal circle. This results in different rotational speeds (wheel speed per time unit) for the different wheels at a specified vehicle speed or different wheel rotational speeds for the different wheels for a specified travel path.

By carrying a load, for example on the fork of a forklift truck, the load wheels are more heavily loaded and the at least one wheel further from the load (optionally the drive wheel or wheels) is less heavily loaded or even relieved. This results in a new, load-dependent ratio of the wheel rotations or wheel rotational speeds due to a load-dependent change in the wheel circumferences, which can be used for determining the load weight, for example for a plausibility check of a weight measurement carried out by at least one pressure sensor, or can also be used to produce the individual measurement system of the vehicle for the purpose of weight measurement.

If the determination or estimation of the load weight on the basis of the change in the wheel rotations or wheel rotational speeds is used to produce the individual measurement system of the vehicle for the purpose of weight measurement, sufficient reliability of the measurement can be achieved in that the vehicle travels a minimum path distance, for example in a narrow aisle, as the basis for determining or estimating the load weight. The load weight can then be determined or estimated with sufficient accuracy from the determined speed ratios of the two wheel axles.

The proposal of the invention is based on a very considerable effect. Depending on the vehicle type, in particular depending on the unladen weight of the vehicle and the wheel diameters, a path measurement based on detected wheel rotations is distorted by a carried load by from 0.4 to 1.5% for example. This is only the effect which applies to the load wheel or wheels. This effect is so significant that in conventional industrial trucks, it must be regularly compensated by means of dedicated weight measurement in the case of a positioning system based on the wheel rotations. If, on the other hand, this effect is used for the purpose of weight measurement, achieving sufficient accuracy of the weight measurement is merely a question of the resolution of speed sensors used, and optionally the resolution of a path measurement system, and optionally the adequate length of the measurement distance on which the determination or estimation is based.

In general, it is proposed that the speed ratio is determined by, when driving the vehicle, a number of rotations of the at least one first wheel which occur over a defined distance or in a defined time interval, and a number of rotations of the at least one second wheel which occur when driving the defined distance or in the defined time interval being directly or indirectly measured or determined, that the speed ratio is determined herefrom, and that the load weight is determined or estimated from the speed ratio thus determined.

Further, it is generally proposed that the speed ratio for a carried load is determined at least once from sensor data comprising speed data and/or rotational speed data of a sensor associated with the first wheel, and speed data and/or rotational speed data of a sensor associated with the second wheel in order to determine or estimate the load weight. In this case, it can be provided for the speed ratio for a carried load to be repeatedly or continuously determined from the sensor data in order to repeatedly or continuously determine or estimate the load weight.

If a minimum path distance is used for determining or estimating the load weight, a minimum path distance of one meter should generally be sufficient when using a path measurement system of adequate resolution. Thus, for example, path distances between path markers which are provided anyway (e.g. transponders) in the ground can be used as a measurement distance. If a measurement system implementing the method is used to check the plausibility of another, dedicated weight measurement system, then the measurement system according to the invention can permanently run in the background and will provide more accurate results at an increasing path distance.

It can expediently be provided that the reference data comprise a load-free reference speed ratio between the at least one first wheel and the at least one second wheel for the vehicle without any carried load at an initial state of the wheels, preferably when the wheels are wear-free. It is furthermore proposed that the reference data comprise at least one load reference speed ratio between the at least one first wheel and the at least one second wheel for the vehicle having a or a respectively carried defined calibration load at an initial state of the wheels, preferably when the wheels are wear-free.

A preferred embodiment is characterised in that the load weight is interpolated using the determined speed ratio from the load-free reference speed ratio and the at least one load reference speed ratio on the basis of the load weight of the calibration load or the respective calibration load and optionally a vehicle weight of the vehicle without any carried load.

For example, the load-free reference speed ratio and the load reference speed ratio may be determined once during production of the commercial vehicle by means of a respective teach-in drive and the corresponding reference values then stored in the vehicle control system. During operation, the intermediate values are then interpolated. However, it is also entirely possible to determine a plurality of load reference speed ratios on the basis of different load weights and to store said ratios in the control system in order to then be able to better interpolate the intermediate values during operation.

Preferably, wheel wear is determined independently of the weight measurement. The weight measurement, that is to say the determination or estimation of the load weight, can then particularly advantageously be based on speed values already compensated with respect to wear, it being possible to expediently linearly interpolate the load weight from the speed ratio without any load and the speed ratio at the maximum load.

In general it is suggested that a wear state of the wheels is determined and taken into account when determining or estimating the load weight. In this case, it can expediently be provided for the wear state of the wheels to be determined on the vehicle without any carried load, by a number of rotations of the at least one first wheel which occur when driving the vehicle without any carried load over a defined distance, and a number of rotations of the at least one second wheel which occur when driving the defined distance being directly or indirectly measured or determined, and the respective wear state of the wheels and/or a reference speed ratio between the at least one first wheel and the at least one second wheel for the vehicle without any carried load, taking account of the wear state, and/or speed correction values for the wheels are determined herefrom. High accuracy is hereby achieved for the load weight determination or load weight estimation.

For example, the reference data on the basis of which the load weight is determined or estimated may comprise the wear state or at least one of the wear state, the reference speed ratio and the speed correction values. In this connection, it is further proposed that the respective number of rotations or the speed data and/or rotational speed data are compensated with respect to the wear state of the wheels, using the speed correction values, and the speed ratio is determined from compensated speed data or rotational speed data, in order to determine or estimate the load weight.

The vehicle wheels may be what are known as bandage wheels, which are formed of a wheel rim and what is known as a bandage tyre. If, in the context of the method, an occurrence of a number of rotations is to be measured or determined over a defined driving distance, path markers of in principle any kind (for example visual path markers or transponders) may be used for defining the driving distance. For example, path markers which already exist in an aisle or the like may be used.

The method according to the invention is preferably implemented as a method for controlling at least one drive unit of a commercial vehicle, in particular an industrial truck such as a forklift truck. In general, the invention provides a method for controlling at least one drive unit of a commercial vehicle, in particular an industrial truck such as a forklift truck, comprising determining or estimating the load weight of a load carried by the vehicle according to the above-described method for determining or estimating a load weight of a carried load.

The vehicle does not need to have any load sensors which are independent of the determination of the speed ratio in order to determine the load weight of a load carried by the vehicle. However, it may very expediently be provided that the vehicle comprises at least one load sensor which is independent of the determination of the speed ratio in order to determine the load weight of a load carried by the vehicle, and that the load weight is in addition determined or estimated on the basis of the determined speed ratio and is used, for example, for checking the plausibility of the load weight determination made using the load sensor.

It is in particular suggested that vehicle dynamics of the vehicle are configured on the basis of the load weight of a carried load, and/or that a vehicle profile associated with the load weight is selected from a plurality of vehicle profiles associated with different load weights or load weight ranges.

In general, it is suggested that the at least one first wheel is a front wheel and the at least one second wheel is a rear wheel of the vehicle.

Furthermore, the invention provides a commercial vehicle, in particular an industrial truck (such as a forklift truck) which comprises at least one drive unit, at least one load carrier and at least one first wheel loaded by a load carried in the load carrier of the vehicle and at least one second wheel which is less heavily loaded or not loaded by a load carried in the load carrier or is relieved by a load carried in the load carrier, a control system of the vehicle or the drive unit thereof being coupled to at least one first speed sensor associated with the/a first wheel and to at least one second speed sensor associated with the/a second wheel of the vehicle.

According to the invention, it is provided that the control system is configured or programmed to determine a speed ratio between a first speed of the first wheel detected by the first speed sensor and a second speed of the second wheel detected by the second speed sensor, and to determine or estimate herefrom the load weight of a load carried in the load carrier, in order to fulfil at least one function relating to the load weight or taking account of the load weight, in particular a control function.

Preferably, the control system is configured or programmed to carry out the method according to the invention for determining or estimating a load weight and/or the control method according to the invention.

A particularly preferred embodiment of the vehicle according to the invention is characterised in that the control system is coupled to at least one sensor or device of the vehicle which responds to optical or electrical or magnetic or electromagnetic markers and/or to a transponder, in order to determine, using the first and the second speed sensor, rotations of the at least one first wheel and the at least second wheel which occur when driving a reference driving distance defined by at least one marker and/or at least one transponder, and to evaluate said rotations when carrying out the method, for example in order to determine a wear state of the wheels in the case of driving without any load carried in the load carrier and/or to determine or estimate the load weight with a defined level of accuracy.

The proposals of the invention can be implemented without much outlay in terms of sensor technology, especially as various types of industrial truck, for example narrow aisle trucks, are frequently already equipped with speed sensors on both wheel axles in order to carry out path measurement in the narrow aisle. Thus, a vehicle according to the invention can be provided with little development outlay and usually without significant additional production outlay on the basis of a vehicle of this type. In the case of a vehicle of this kind, retrofitting is also considered in order to implement the proposals of the invention, which retrofitting may essentially consist of reprogramming a control system and/or loading into the control system of the vehicle a control program which implements the invention.

In the context of the method, it can advantageously be provided that the ratio for wheel rotation after a load change is determined for a defined driving path (fixed path delta) and the load weight is determined or estimated, in particular calculated, herefrom. The ratio of the wheel rotations can also then be determined for the further driving path in order to continue to monitor the weight measurement.

In order to achieve high accuracy in the weight measurement from the ratio of wheel rotations, the wheel wear can be determined on the basis of defined driving distances, for example using path markers (such as transponders) which are already present, for example which have been introduced into a narrow aisle. Advantageously, a drive when the forks are lowered (no load on the forks) may be made in order to determine the wheel wear, in that the wheel wear is determined from the vehicle weight which is then known.

The invention will be described in more detail in the following on the basis of an embodiment and with reference to the figures, in which:

FIG. 1 is a schematic view of a forklift truck according to an embodiment of the invention.

Figure 2:
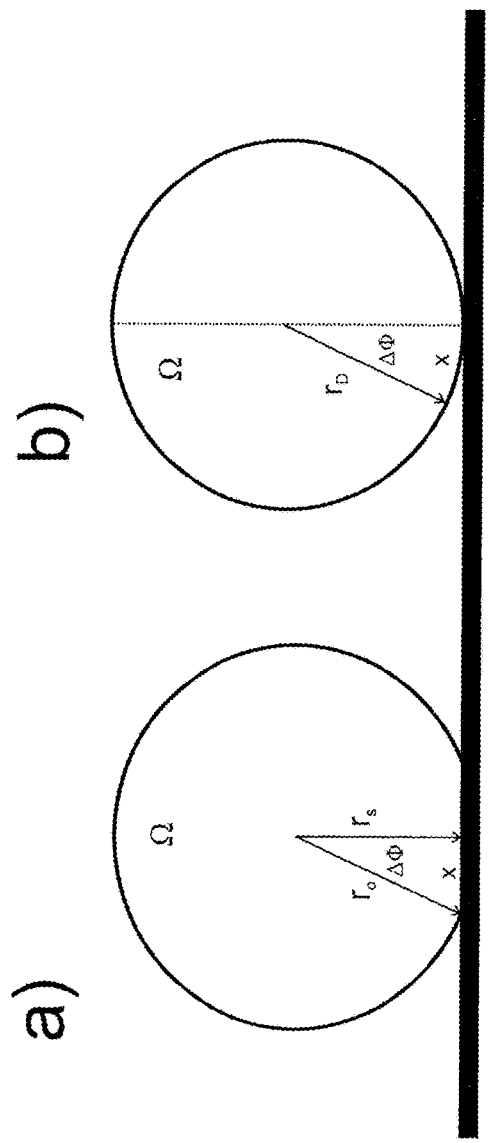

FIG. 2 explains what is known as the "dynamic rolling radius" and shows, in sub-FIG. 2a) a deflected tyre and, in sub-FIG. 2b), a fixed wheel having the same rolling circumference as the deflected wheel.

Figure 3:
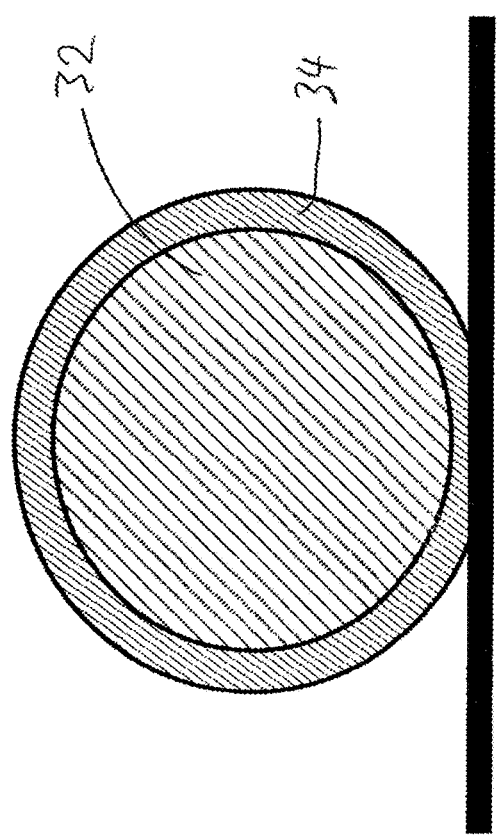

FIG. 3 is a schematic view of a wheel rim having a bandage which is deformed (deflected) by the wheel compression.

An industrial truck 10 as shown in FIG. 1 is a forklift truck having a front load wheel pair 12 and at least one rear wheel 14, for example a rear wheel pair 14. Without restricting the generality, the rear wheel or the rear wheels 14 may be the drive wheel or the drive wheels. The forklift truck 10 comprises, in the conventional manner, a mast 16 having a crane fork 18 which is associated with at least one hydraulic lifting cylinder 20. The forklift truck is equipped with at least one drive unit, for example an electric drive unit, on which a control system 22 acts. The front wheels 12 and the rear wheel or the rear wheels 14 are each associated with a speed sensor 24 and 26 respectively, which sensors detect the rotations and/or the rotational speeds of the wheels and supply corresponding sensor signals to the control system 22.

The forklift truck 10 may be configured having a pressure sensor or the like which is associated with the lifting cylinder 20 for detecting the load weight 28 of a load carried by the fork 18. In addition or alternatively, according to the invention a load weight is determined or estimated on the basis of the sensors 24 and 26, as will be described in more detail. A path marker sensor 30 may be provided, which responds to path markers defining driving distances of defined lengths, for example optical path markers or electrical, magnetic or electromagnetic path markers, for example what are known as transponders, such as RFID/NFC transponders.

The wheels of the vehicle 10 may be what are known as bandage wheels, which comprise a wheel rim 32 and a bandage tyre 34 (also known as "bandage" for short) carried thereby, as is shown schematically in FIG. 3. The bandage is deformed, to a greater or lesser extent, by the weight of the vehicle and the load which may be carried thereby. The bandage deflects and flattening occurs, bandage material being displaced to either side, such that what is known as a "latch" is formed. The term "latch" denotes the contact surface between the tyre and the road, which usually forms a continuous surface in the case of an unprofiled tyre on a flat surface. The outer periphery of the bandage is then no longer circular, resulting in a rolling circumference which is dependent on the deflection. Specifically, for a given surface area, the ideal circle has the smallest circumference and any deviation from the ideal circle results in a larger circumference assuming that the surface area is the same. FIG. 3 schematically shows the deflection of the bandage 34.

The effective rolling circumference of the wheels 12 and the wheel 14 or the wheels 14 is thus dependent on the load weight acting on the respective wheel. The load weight consists of the weight of the unladen vehicle 10, that is to say without any load 28 carried in the fork 18, and the additional load weight of the carried load when the vehicle is loaded.

Typically, a forklift truck comprises a counterweight 36 in a region of the vehicle remote from the fork 18. Said counterweight primarily loads the wheel 14 further from the fork 18 or the wheels 14 further from the fork 18, and carrying a load in the fork 18 can then lead to a certain amount of relief of the rear wheel 14 or the rear wheels 14. However, carrying a load 28 in the fork 18 results in any case in a corresponding increase in the overall load weight acting on the front wheels 12.

In general it can therefore be seen that the wheels 12 closer to the load carrier (in this case the fork 18) and the wheel 14 or wheels 14 further from the load carrier (in this case the fork 18) are differently loaded by a load carried in the load carrier compared with the loading by the unladen vehicle, it even being possible, in the case of a counterweight close to the rear wheels, for the rear wheels to be relieved by carrying a load in the load carrier. Thus, it is not only the deflection of the tyres, in particular of the bandages, or of the wheels in general which is load-dependent, but also the ratio of said deflections. The deflections determine the rolling circumferences, with the result that not only are the rolling circumferences load-dependent, but the ratio of the rolling circumferences is also load-dependent.

The influence on the rotations of the wheels when driving over a defined distance, or the influence on the rotational speeds of the wheels, can be seen in more detail in FIG. 2. Based on the usually correct assumption that the tyre circumference surface elements adhere to the road in the case of a latch, the wheel having the deflected tyre will continue to roll by the distance x in the case of an angular rotation $\Delta\phi$ (FIG. 2a)). Taking $r_0$ as the undeformed wheel radius, $\Delta r$ as the tyre deflection and $r_s = r_0 - \Delta r$ as the static tyre radius, in the deflected state:

$$r_0 \sin \Delta\phi = x$$

$$r_0 \cos \Delta\phi = r_s$$

If the movement of the tyre is compared with the rolling of a fixed wheel (cf. FIG. 2b)), then what is known as the dynamic rolling radius $r_D$ thereof must be selected such that the distance x is also covered in the case of the angular rotation $\Delta\phi$, thus $$x = r_D \Delta\phi$$

For the dynamic rolling radius, this results in:

$$r_D = r_0 \sin \Delta\phi / \Delta\phi$$

For small but finite angular rotations, the sine function and the cosine function expand in series, giving the approximate results:

$$r_D = r_0(1 - 1/6 \Delta\phi^2)$$

and $$r_s/r_0 = \cos \Delta\phi = 1 - 1/2\Delta\phi^2 \text{ or } \Delta\phi^2 = 2(1 - r_s/r_0)$$

which then results, for the dynamic rolling radius, in approximately:

$$r_D = r_0 = 2/3 r_0 + 1/3 r_s$$

Thus, on account of $r_s = r_s(F_z)$, the dynamic rolling radius depends on the wheel load $F_z$ and here, in the first approximation, is calculated from the undeformed wheel radius $r_0$ and the static wheel radius $r_s$ in the state deformed under the wheel load.

If the wheels rotate at the angular speed $\Omega$, then the surface elements of the wheel circumference are transported by the latch at the average speed of:

$$V_t = r_D \Omega$$

With reference to the embodiment in FIG. 1, a load-dependent dynamic rolling radius of $r_{D1}$ thus results for the front wheel 12 and a dynamic rolling radius of $r_{D2}$ results for the rear wheel or the rear wheels 14, corresponding in each case to a rolling circumference of $U_{D1} = 2\pi r_{D1}$ or $U_{D2} = 2\pi r_{D2}$.

Based on a distance S, over which the wheels roll, the following respective rotational speeds $Z_{D1}$ for the front wheel 12 and $Z_{D2}$ for the rear wheel result:

$$Z_{D1} = S/U_{D1}$$

$$Z_{D2} = S/U_{D2}$$

The speed ratio between the speed of the front wheel or the front wheels and that of the rear wheel or the rear wheels is then:

$$V = Z_{D1}/Z_{D2} = r_{D2}/r_{D1},$$

it being possible to use the approximations given above on the basis of the series expansions for the dynamic rolling radii $r_{D1}$ and $r_{D2}$ of the wheels.

On the basis of the above-described operating principle, the control system 22 of the industrial truck 10 can determine or at least estimate the load weight of a load 28 carried by the fork 18, based on the speed ratio, determined by the sensors 24 and 26, between a first speed of the front wheel 12 or the front wheels 12 and a second speed of the rear wheel 14 or the rear wheels 14. It is also possible for the number of rotations or a rotational speed to be recorded for each of the two front wheels 12 and/or for each of the two rear wheels 14 and for the speed ratios representing the load weight to be determined herefrom.

In order to determine the load weight, the control system 22 can compare the determined speed ratio with calibration data stored in the control system or in a memory associated therewith, which calibration data comprise at least the speed ratio of the wheels for an unladen industrial truck and the speed ratio for the industrial truck having a defined load carried by the fork 18, for example the maximum permissible load, and permit interpolation of the load weight of the currently carried load. The corresponding calibration data can be taught into the control system 22 during production of the industrial truck. However, it is also possible for a user to detect said calibration data by means of driving the vehicle along a defined distance in the unladen state and in the state laden by a defined load and to teach said data into the control system.

If it is the case, here, of driving along a defined distance, determining the load weight ultimately depends only on a minimum distance in order to achieve a minimum level of accuracy. Driving along a defined distance is more important for determining a wear state of the wheels in the unladen state of the vehicle. Then, in a manner known per se, the number of rotations of the wheels when rolling over the defined distance can be detected and the wear state of the wheels determined herefrom, which wear state can be stored as a parameter in the control system 22 or in an associated memory in order to be taken into account when determining or estimating the load weight. Particularly expediently, the number of rotations or the rotational speeds detected for the individual wheels can also be corrected in order to take account of the wheel wear, such that wear-compensated speed values are calculated from the detected speed values and the wear-compensated speed ratio is calculated herefrom or the wear-compensated speed ratio is calculated from the determined speed ratio. The determination or estimation of the load weight can advantageously be based on said wear-compensated speed values or the wear-compensated speed ratio.

Instead of rotational speeds, all the calculations and determinations can also be made on the basis of rotational speeds of the wheels, as long as said rotational speeds can be sufficiently accurately detected by means of a corresponding rotary encoder. If, here, this is a speed sensor 24 or 26 of the vehicle 10, said sensor should therefore be understood not only as a sensor which detects a number of rotations, but should also include rotational speed sensors.

However, it is possible to determine the speed ratio from detected rotations of the vehicle wheels using concepts of conventional path measurement systems and/or positioning systems, meaning that a conventional sensor system can be used and merely a different or additional evaluation of the sensor data is made.

The invention claimed is:

1. A method for determining or estimating a load weight of a load carried by a commercial vehicle using a vehicle control system, in particular by an industrial truck such as a forklift truck, comprising:
   a) determining with the vehicle control system a speed ratio between a first speed of at least one first wheel loaded by a load carried in a load carrier of the vehicle and a second speed of at least one second wheel of the operating vehicle which has received the load in the load carrier, which second wheel is less heavily loaded or not loaded by a load carried in the load carrier or is relieved by a load carried in the load carrier;
   b) determining or estimating with the vehicle control system the load weight of the carried load (28) on the basis of the determined speed ratio and predetermined reference data stored in data storage, wherein a wear state of the wheels is taken into account in said determining or estimating the load weight, and
   c) the vehicle control system controlling at least one drive unit of a commercial vehicle based on the determining or estimating the load weight of the carried load carried by the vehicle.

2. The method according to claim 1, wherein the speed ratio is determined by, when driving the vehicle, a number of rotations of the at least one first wheel which occur over a defined distance or in a defined time interval, and a number of rotations of the at least one second wheel which occur when driving the defined distance or in the defined time interval being directly or indirectly measured or determined, in that the speed ratio is determined herefrom, and in that the load weight is determined or estimated from the speed ratio thus determined.

3. The method according to claim 1, wherein the speed ratio for a carried load is determined at least once from sensor data comprising speed data and/or rotational speed data of a sensor associated with the first wheel, and speed data and/or rotational speed data of a sensor associated with the second wheel in order to determine or estimate the load weight.

4. The method according to claim 3, wherein the speed ratio for a carried load is repeatedly or continuously determined from the sensor data in order to repeatedly or continuously determine or estimate the load weight.

5. The method according to claim 1, wherein the reference data comprise a load-free reference speed ratio between the at least one first wheel and the at least one second wheel for the vehicle without any carried load at an initial state of the wheels, preferably when the wheels are wear-free.

6. The method according to claim 5, wherein the load weight is interpolated using the determined speed ratio from the load-free reference speed ratio and the at least one load reference speed ratio on the basis of the load weight of the calibration load or the respective calibration load and optionally a vehicle weight of the vehicle without any carried load.

7. The method according to claim 1, wherein the reference data comprise at least one load reference speed ratio between the at least one first wheel and the at least one second wheel for the vehicle having a or a respectively carried defined calibration load at an initial state of the wheels, preferably when the wheels are wear-free.

8. The method according to claim 1, wherein the wear state of the wheels is determined on the vehicle without any carried load, by a number of rotations of the at least one first wheel which occur when driving the vehicle without any carried load over a defined distance, and a number of rotations of the at least one second wheel which occur when driving the defined distance being directly or indirectly measured or determined, and the respective wear state of the wheels and/or a reference speed ratio between the at least one first wheel and the at least one second wheel for the vehicle without any carried load, taking account of the wear state, and/or speed correction values for the wheels are determined herefrom.

9. The method according to claim 1, wherein the reference data on the basis of which the load weight is determined or estimated comprise the wear state or at least one of the wear state, the reference speed ratio and the speed correction values.

10. The method according to claim 9, wherein the respective number of rotations or the speed data and/or rotational speed data are compensated with respect to the wear state of the wheels, using the speed correction values, and the speed ratio is determined from compensated speed data or rotational speed data, in order to determine or estimate the load weight.

11. The method according to claim 1, wherein the vehicle does not comprise any load sensors which are independent of the determination of the speed ratio in order to determine the load weight of a load carried by the vehicle.

12. The method according to claim 1, wherein the vehicle comprises at least one load sensor which is independent of the determination of the speed ratio in order to determine the load weight of a load carried by the vehicle, and in that the load weight is in addition determined or estimated on the basis of the determined speed ratio and is preferably used for checking the plausibility of the load weight determination made using the load sensor.

13. The method according to claim 1, wherein vehicle dynamics of the vehicle are configured on the basis of the load weight of a carried load, and/or in that a vehicle profile associated with the load weight is selected from a plurality of vehicle profiles associated with different load weights or load weight ranges.

14. The method according to claim 1, wherein the at least one first wheel is a front wheel and the at least one second wheel is a rear wheel of the vehicle.

15. The method according to claim 1, wherein said commercial vehicle has a load carrier.

16. The method according to claim 1, wherein said load carrier is located proximate front wheels of said commercial vehicle.

17. A commercial vehicle, in particular an industrial truck such as a forklift truck, comprising at least one drive unit, at least one load carrier and at least one first wheel loaded by a load carried in the load carrier of the vehicle and at least one second wheel which is less heavily loaded or not loaded by a load carried in the load carrier or is relieved by a load carried in the load carrier, a control system of the vehicle or the drive unit thereof being coupled to at least one first speed sensor associated with the/a first wheel and to at least one second speed sensor associated with the/a second wheel of the vehicle, wherein the control system is configured or programmed to determine a speed ratio between a first speed of the first wheel detected by the first speed sensor and a second speed of the second wheel detected by the second speed sensor, and to determine or estimate herefrom the load weight of a load carried in the load carrier, in order to fulfil at least one function relating to the load weight or taking account of the load weight, in particular a control function, including that a wear state of the wheels is taken into account in the determining or estimating the load weight.

18. The commercial vehicle according to claim 17, wherein the control system is coupled to at least one sensor or device of the vehicle which responds to optical or electrical or magnetic or electromagnetic markers and/or to a transponder, in order to determine, using the first and the second speed sensor, rotations of the at least one first wheel and the at least second wheel which occur when driving a reference driving distance defined by at least one marker and/or at least one transponder, and to evaluate said rotations when carrying out the method.

19. The commercial vehicle according to claim 17, wherein said the control system is configured or programmed such that the wear state of the wheels is determined on the vehicle without any carried load, by a number of rotations of the at least one first wheel which occur when driving the vehicle without any carried load over a defined distance, and a number of rotations of the at least one second wheel which occur when driving the defined distance being directly or indirectly measured or determined, and the respective wear state of the wheels and/or a reference speed ratio between the at least one first wheel and the at least one second wheel for the vehicle without any carried load, taking account of the wear state, and/or speed correction values for the wheels are determined herefrom.

\* \* \* \* \*